(12) United States Patent
Wengrovitz (10) Patent No.: US 8,737,272 B2
(45) Date of Patent: May 27, 2014

(54) CALL ROUTING USING INFORMATION IN SESSION INITIATION PROTOCOL MESSAGES

(75) Inventor: Michael Wengrovitz, Concord, MA (US)

(73) Assignee: Alcatel Lucent, Paris (FR)

( * ) Notice: Subject to any disclaimer, the term of this patent is extended or adjusted under 35 U.S.C. 154(b) by 1899 days.

(21) Appl. No.: 11/427,513

(22) Filed: Jun. 29, 2006

(65) Prior Publication Data

US 2006/0250989 A1  Nov. 9, 2006

Related U.S. Application Data

(62) Division of application No. 10/020,783, filed on Dec. 12, 2001, now abandoned.

(60) Provisional application No. 60/281,143, filed on Apr. 3, 2001.

(51) Int. Cl.
*H04L 12/16* (2006.01)

(52) U.S. Cl.
USPC ........... 370/260; 370/352; 370/353; 370/354; 370/355; 370/356; 370/351; 370/261; 370/262; 370/338; 709/206; 709/227

(58) Field of Classification Search
USPC ......................................... 370/260, 351–356
See application file for complete search history.

(56) References Cited

U.S. PATENT DOCUMENTS

| | | | |
|---|---|---|---|
| 6,560,329 B1 * | 5/2003 | Draginich et al. | 379/265.02 |
| 6,704,304 B1 * | 3/2004 | Gallagher et al. | 370/352 |
| 6,744,759 B1 * | 6/2004 | Sidhu et al. | 370/356 |
| 6,771,639 B1 * | 8/2004 | Holden | 370/352 |
| 6,870,848 B1 * | 3/2005 | Prokop | 370/395.2 |
| 7,684,553 B2 * | 3/2010 | Wallenius et al. | 379/219 |
| 2002/0073203 A1 * | 6/2002 | Gilleland | 709/227 |

* cited by examiner

*Primary Examiner* — Asad Nawaz
*Assistant Examiner* — Najeebuddin Ansari
(74) *Attorney, Agent, or Firm* — Garlick & Markison (57) ABSTRACT

A system and method for efficient and accurate establishment of SIP sessions between calling and called end-points. A calling endpoint creates a SIP INVITE request including a header portion and a body portion. The header portion includes standard routing information and the body portion includes additional information about the user and relevant to caller's intent. A SIP server receives a SIP INVITE request and determines an address of the called end-point as a function of the standard routing information contained in the header and the additional caller information contained in the body. The SIP server routes the session to the determined address.

19 Claims, 7 Drawing Sheets

CALL ROUTING USING INFORMATION IN SESSION INITIATION PROTOCOL MESSAGES

CROSS-REFERENCE TO RELATED APPLICATION(S)

This application is a divisional of application Ser. No. 10/020,783 filed Dec. 12, 2001 now abandoned.

This application claims the benefit of U.S. provisional application No. 60/281,143 filed on Apr. 3, 2001, the content of which is incorporated herein by reference. This application also contains subject matter which is related to the subject matter disclosed in U.S. application entitled "Session Initiation Protocol Routing Using Voice Cookies", filed on Dec. 5, 2001, the content of which is also incorporated herein by reference.

FIELD OF THE INVENTION

This invention relates generally to Internet telephony systems, and more particularly, to intelligent call routing in Internet telephony systems that adhere to session initiation protocol.

BACKGROUND OF THE INVENTION

Session Initiation Protocol (SIP) is a signaling protocol for creating, modifying, and terminating multimedia sessions, including Internet telephone calls, with one or more SIP-endpoints. Details about the SIP signaling protocol is set forth in Internet Engineering Task Force Request for Comment 2543 entitled "SIP: Session Initiation Protocol," March 1999 (hereinafter referred to as RFC 2543), which is incorporated herein by reference. SIP provides an alternative to PBX- or H.323-signaled telephony.

Although SIP end-points can directly place calls to one another, SIP servers, including proxy and redirect servers, are typically engaged during the call set-up process to route calls. Such call routing includes ascertaining called end-points in response to call establishment messages, referred to as INVITE messages, originated by calling end-points. The INVITE messages are either proxied to ascertained called end-points or the addresses of ascertained called end-points are returned to the calling end-points for allowing the calling end-points to directly place calls to the called end-points.

Figure 1A:
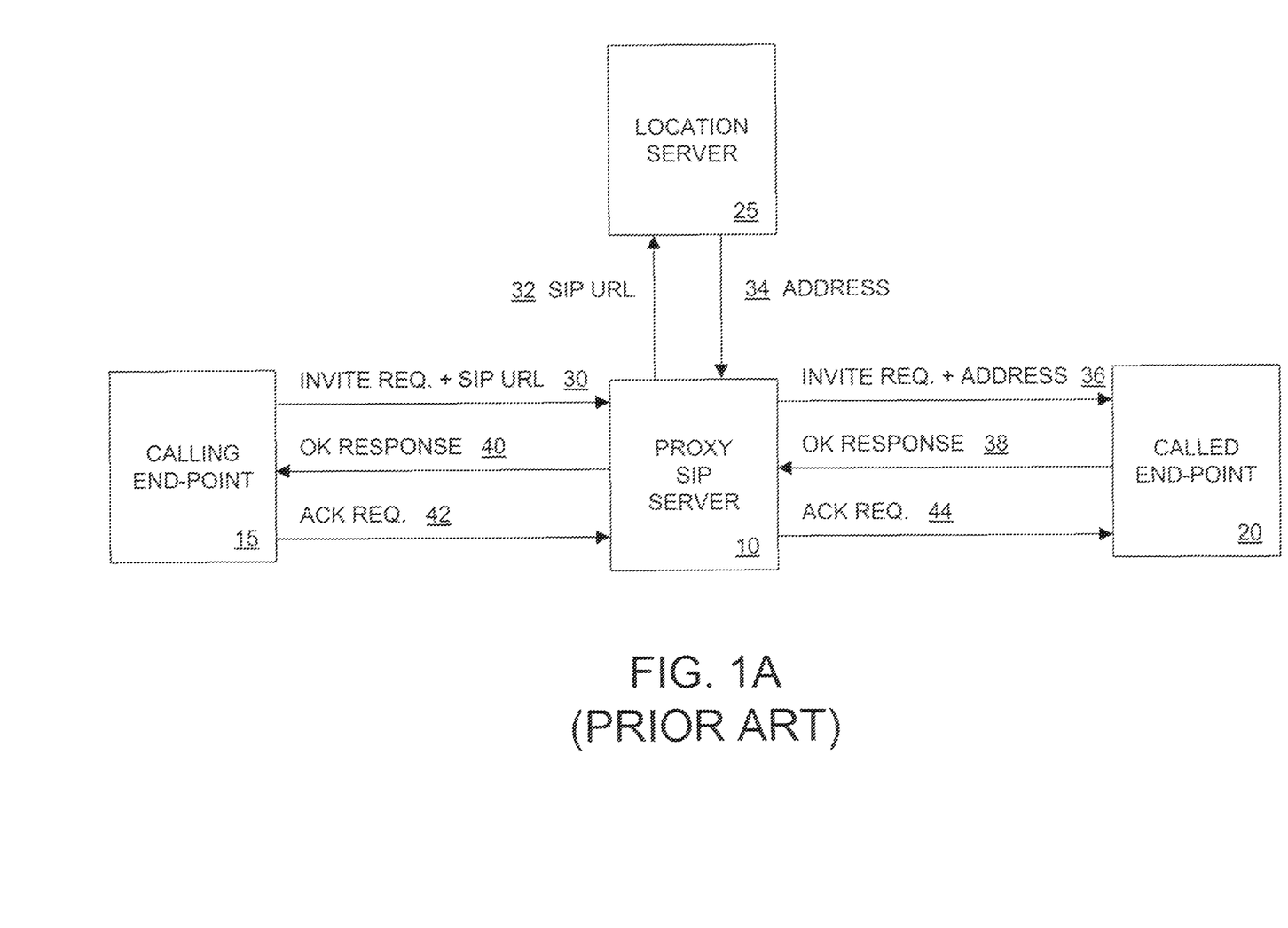
FIG. 1A is a functional block diagram of establishing a SIP call using a typical proxy SIP server.

FIG. 1A is a functional block diagram for establishing a SIP call via a typical proxy SIP server 10. In step 30, the proxy server 10 receives an invitation from a calling end-point 15 in the form of an INVITE request. The INVITE request includes routing information in the "From:", "To:", "Contact:" and other standardized fields within the INVITE message header. The "To:" field of the message header includes a generic SIP URL associated with a called end-point 20.

The proxy server 10 accepts the INVITE request and in step 32, preferably engages a location server 25 for routing the call based on the routing information in the SIP message header. In this regard, the location server 25 retrieves the SIP URL associated with the called end-point to resolve the URL to a more precise address. For example, a call directed to a generic SIP URL such as, for example, "sales@acme.com" may be resolved to a particular person, such as, for example, "bob@ny.acme.com." The retrieved address information is transmitted to the proxy server 10 in step 34.

In step 36, the proxy server 10 issues a second INVITE request to the more precise address. The called end-point 20 receives the second INVITE request and alerts the user of the request by, for example, causing the user's telephone to ring. If the call is answered, the called end-point 20, in step 38, returns a success indication to the proxy server 10 via an OK response. The proxy server 10 forwards the OK response in step 40 to the calling end-point 15. The receipt of the success result is confirmed by the calling end-point 15 by transmitting an ACK request to the proxy server 10 in step 42, which then forwards it to the called end-point 20 in step 44.

Figure 1B:
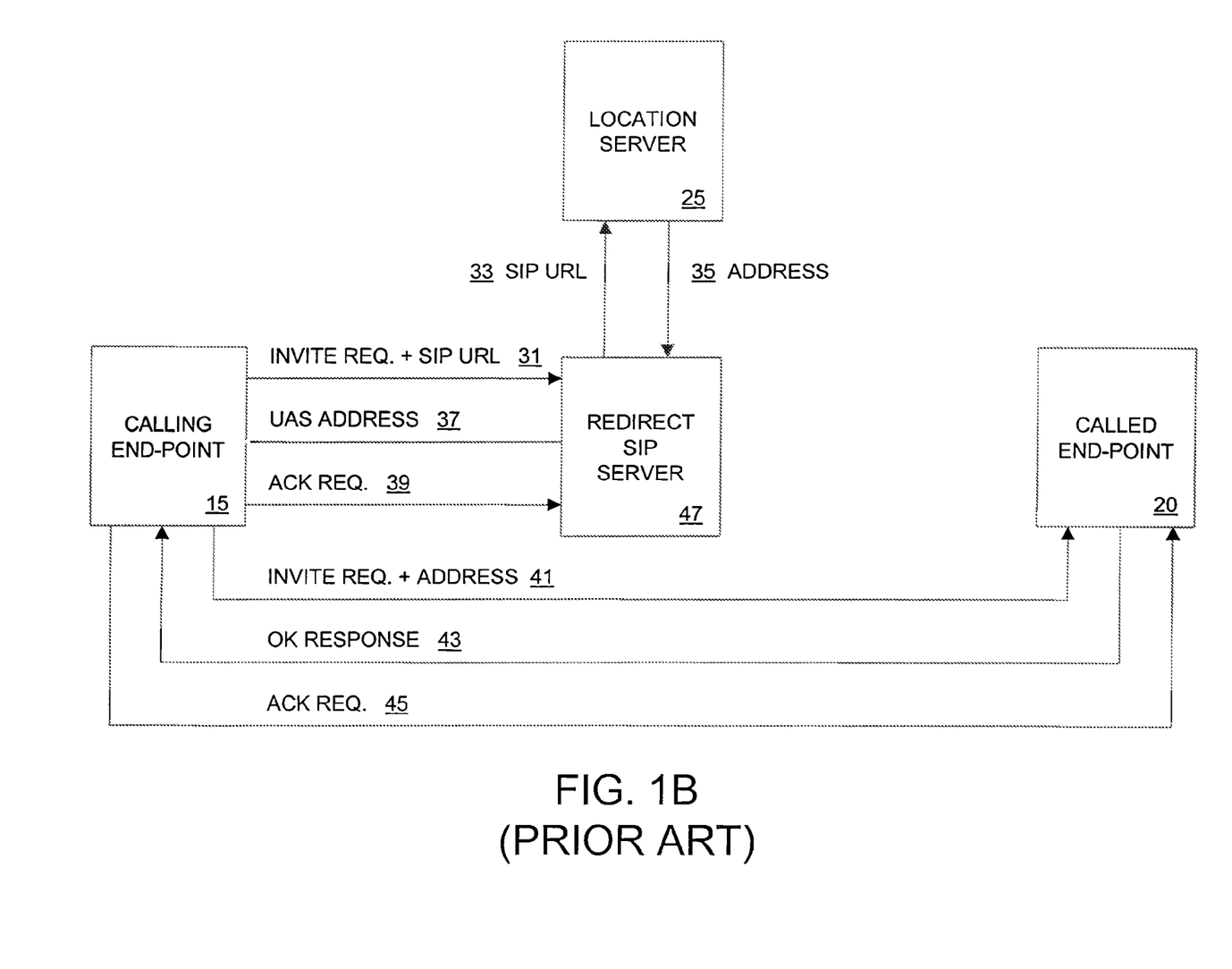
FIG. 1B is a functional block diagram of an alternative method for establishing a SIP call using a typical redirect SIP server.

FIG. 1B is a functional block diagram of an alternative method for establishing a SIP call using a typical redirect SIP server 47. In step 31, the redirect server 47 accepts the INVITE request and, as the proxy server 10 of FIG. 1A, contacts the location server 25 in step 33 for routing the call based on the routing information in the INVITE message header. The redirect server 47, instead of directly contacting the newly found address received in step 35, returns the address to the calling end-point 15 in step 37. The calling end-point 15 confirms receipt of the address via an ACK request in step 39.

The calling end-point 15 issues a new INVITE request to the address returned by the redirect server 30 in step 41. If the call succeeds, the called end-point 20 transmits an OK response in step 43, and the calling end-point 15, in step 45, completes the handshake with an ACK request.

One limitation in current SIP call routing is the limited information on the caller's intent that may be deduced at the time the call is initiated from standard routing fields within the INVITE message headers. In order to gather additional call intent information for routing a call, conventional approaches often make use of interactive voice response (IVR) systems, whereby the caller is prompted for and provides additional information on the caller's intent through selection of dual tone multi-frequency (DTMF) digits on the telephone keypad. For example, a person making a call to a general address may be asked to enter account information through use of DTMF telephone keypad digit entry, and select a particular department, such as customer service, sales, or marketing department. Only after this information is entered can the call be appropriately routed to a suitable call center operator. Use of IVR systems to ascertain additional caller intent information is very cumbersome and inconvenient for the caller, and requires additional message exchanges and database lookups, which translate into slow call setup times and frustration for the caller.

Conventional telephony systems may employ caller ID data that is automatically transmitted with an incoming call in lieu of DTMF key entries to route the call. However the data transmitted is limited to caller ID data, and does not include additional caller intent information that may be desirable to more intelligently route a call.

Newer systems may employ voice recognition techniques in response to IVR prompts to deduce the caller's intent. However, such voice recognition systems are also cumbersome and inconvenient for the caller, subject to error, and also yield slow call setup times.

Accordingly, there is a need for a more efficient system and method for ascertaining caller intent information for intelligent and efficient routing of incoming calls.

SUMMARY OF THE INVENTION

The current invention is directed to a system and method for intelligently routing IP telephone sessions using information transmitted by the caller that extends beyond simple caller ID data. In one embodiment, the invention is directed to a method for establishing an IP telephony session between a first device and a second device where the method includes receiving a call establishment message from the first device, the call establishment message including a first routing information in a header portion of the message, and a second routing information in a body portion of the message. The method further includes determining an address of the second device based on the first and second routing information and using the address for routing the session to the second device.

In another embodiment, the invention is directed to a method for establishing an IP telephony session between a first device and a second device where the method includes retrieving caller intent information from a data store on the first device, creating a call establishment message including a header and a body, the body including the caller intent information, and transmitting the call establishment message to a server for routing the session to the second device based on the caller intent information.

In another embodiment, the invention is directed to a method or establishing an IP telephony session between a first device and a second device where the method includes receiving a call establishment message from the first device, the first establishment message including first caller intent information in a header portion of the message and a second caller intent information in a body portion of the message, determining an address of the second device based on the first and second caller intent information, and using the address for routing the session to the second device.

In a further embodiment, the invention is directed to an IP telephony system including a first device, a second device, and a server operative between the first device and the second device. The first device creates a call establishment message including a header and a body, the body including caller intent information. The server uses the caller intent information for determining an address of the second device for routing the session to the second device.

In another embodiment, the invention is directed to a server in an IP telephony system operative between a first device and a second device. The server is configured for receiving a call establishment message from the first device, the call establishment message including a first routing information in a header portion of the message and a second routing information in a body portion of the message, determining an address of the second device based on the first and second routing information, and using the address for routing the session to the second device.

It should be appreciated, therefore, that the present invention allows a more intelligent determination of a callee address than when only using standard routing information typically included in the header portion of a call establishment message or traditional caller ID information. Additional information about the caller included in the body portion of the call establishment message allows an efficient determination of the caller's intent for routing the call to a most appropriate callee. Because the caller intent information is already made available at the placement of the call, back and forth interactions with the caller for obtaining such information is no longer required.

BRIEF DESCRIPTION OF THE DRAWINGS

These and other features, aspects and advantages of the present invention will be more fully understood when considered with respect to the following detailed description, appended claims, and accompanying drawings where:

DETAILED DESCRIPTION

Figure 2:
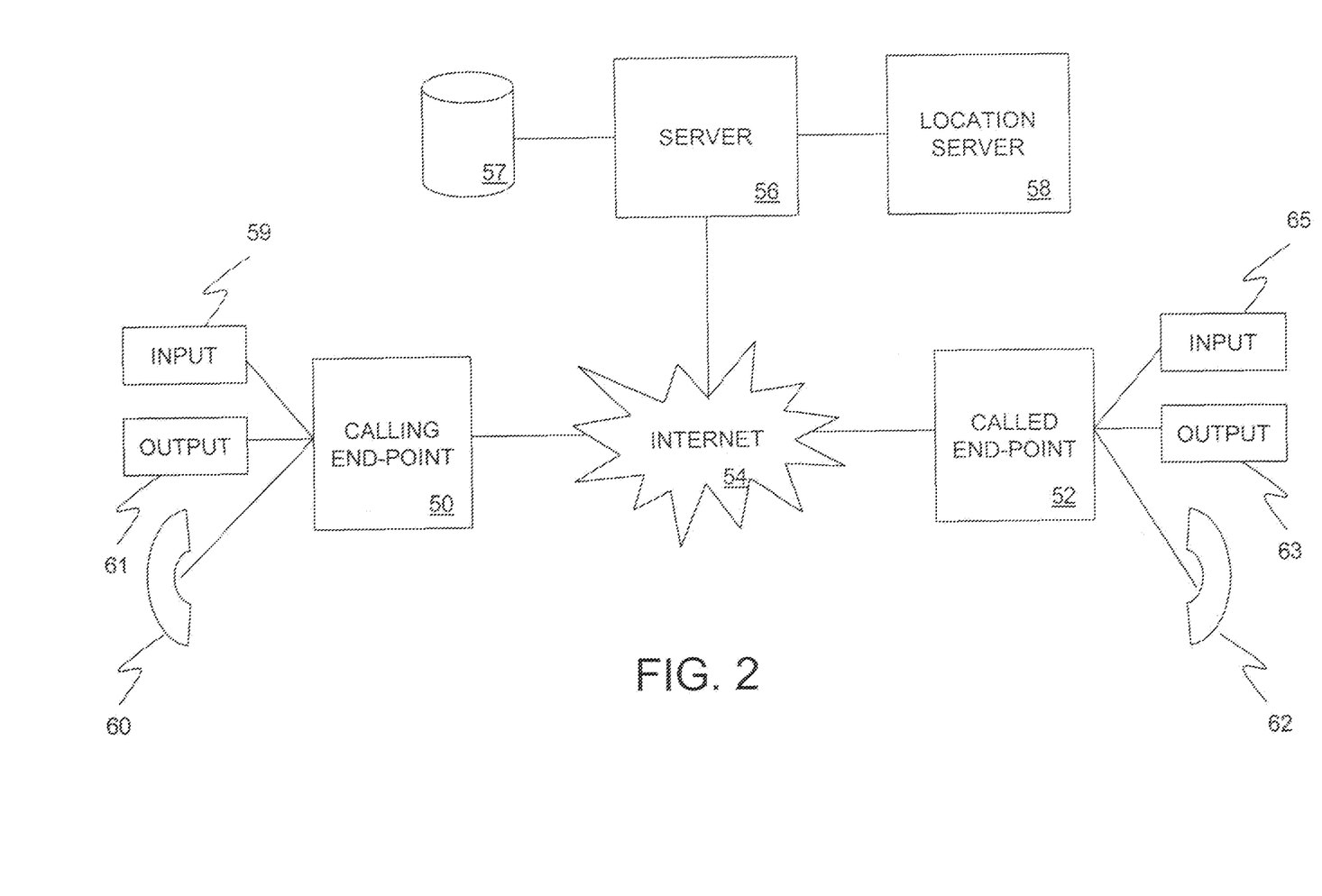
FIG. 2 is a schematic block diagram of a communication system adhering to an IP telephony protocol according to one embodiment of the invention.

FIG. 2 is a schematic block diagram of a communication system adhering to an IP telephony protocol such as, for example, a session initiation protocol (SIP), according to one embodiment of the invention. The system includes a calling end-point 50 initiating a call that is directed to a called end-point 52 over a wide area network, such as, for example, a public internet 54. The calling end-point 50, called end-point 52, and internet 54 preferably adhere to the SIP signaling protocol set forth in RFC 2543. A person skilled in the art should recognize, however, that the any other IP signaling protocol conventional in the art may be used instead of SIP.

The calling and called end-points 50, 52 are preferably SIP-enabled telephones, hand phones, personal computers, switches, routers, and/or the like. Preferably, each calling and called end-point is associated with an input device 59, 65 receiving input data, such as, for example, an input cable, a keyboard, a keypad, or the like. Each calling and called end-point is further associated with an output device 61, 63 presenting output data, such as, for example, an output cable, a display, or the like. The calling and called end-points 50, 52 are preferably also associated with handsets 60, 62 for allowing a voice conversation between a caller and callee.

The communication system of FIG. 2 further includes a server 56 preferably routing calls between the calling and called end-points 50, 52. The server 56 is preferably a SIP proxy or redirect server similar to the proxy and redirect servers 10, 47 of FIGS. 1A- 1B. The server 56, however, is enhanced with the capability of using information transmitted by the calling end-point along with standard routing information, for more intelligently routing the call.

The server 56 is preferably coupled to a database 57 and location server 58. The location server contains location information used for routing calls between the calling end-point and the called end-point. The location server may be similar to the location server 25 of FIGS. 1A-1B. The database 57 is a data store, such as a hard disk drive or drive array, storing caller information and associated routing information for use in addition to the location information to route the calls.

According to one embodiment of the invention, the server 56, database 57, and/or location server 58 reside in a single machine. In another embodiment, the servers reside in two separate machines coupled to each other over a local area network, private wide area network, or the public internet 54.

In general terms, the calling end-point 50 initiates a call by transmitting a call initiation message to the server 56. The call initiation message may be, for example, a SIP INVITE message. The call initiation message includes caller information in addition to standard routing information that may be used by the server 56 to route the call. Such caller information preferably relates to the caller's intent, and may include, by way of example, a name, an address, a phone number, an email address, an account number, a transaction history, a billing history, a department name or selection, an agent preference or selection, a language preference or selection, a product preference or selection, or any other information that may be used to route a call, such as, for example, information typically gathered via an IVR system. The caller information may also include user profile information, user habit information, or information contained in traditional browser cookies associated with a web site domain.

The caller information is preferably generated and stored in the calling end-point 50 according to various mechanisms. For instance, the caller information data may be generated by completing an electronic form that may have a click-to-call button for initiating a call. The caller information may also be written by the server 56 or calling end-point 50 during or after a call. The caller information may, for instance, update transaction history information, call history information, called agent information, and/or the like.

The server 56 receives the call initiation message from the calling end-point 50 and determines an address to which to route the call using information retrieved from the location server 58 and database 57. The call is then routed to the called end-point 52 based on the address, or the address returned to the calling end-point 50 for allowing it to establish a direct communication with the called end-point.

Figure 3:
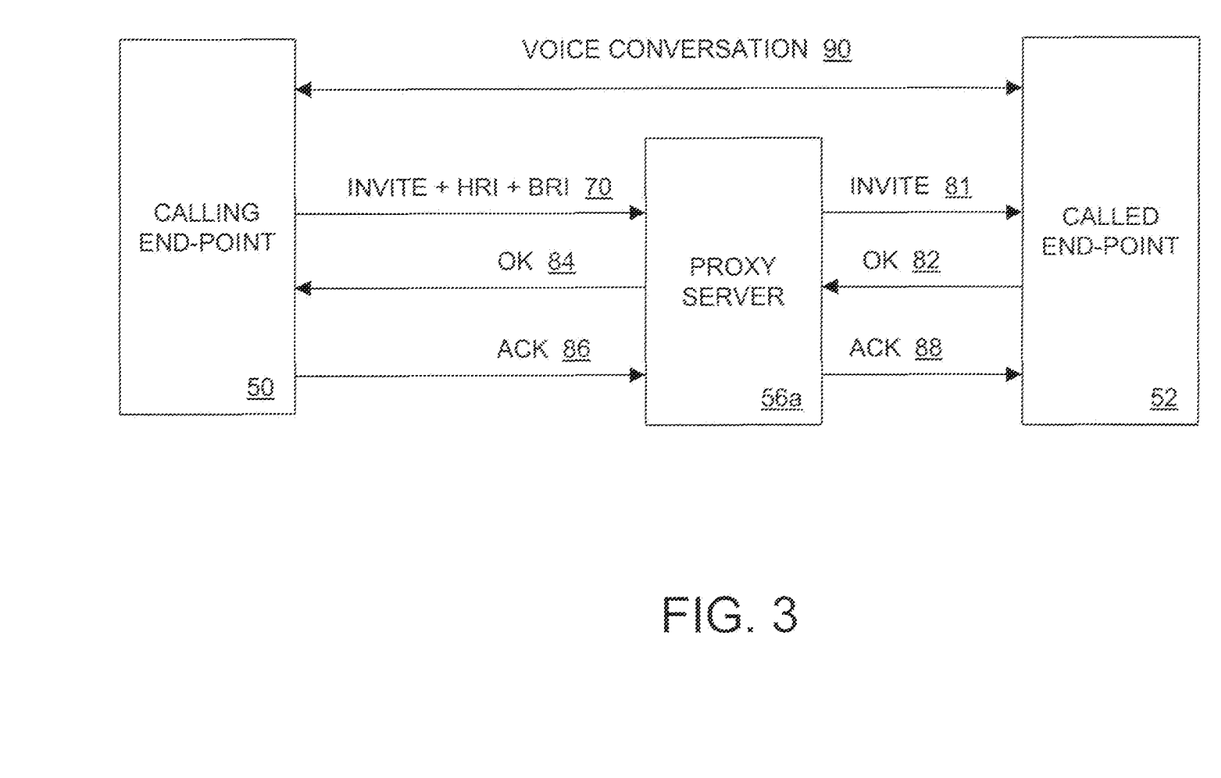
FIG. 3 is a functional block diagram for establishing a SIP call based on caller information according to one embodiment of the invention where a proxy SIP server is used.

FIG. 3 is a functional block diagram for establishing a SIP call based on caller information according to one embodiment of the invention where the server 56 is a proxy server 56*a*. In step 70, the proxy server 56*a* receives an INVITE message from the calling end-point 50. The INVITE request preferably includes standard routing information in the "From:", "To:", "Contact:" and other fields within the INVITE message header, referred to as the header routing information (HRI). The INVITE request further includes caller information in the body of the INVITE message, referred to as the body routing information (BRI).

The proxy server 56*a* ascertains an address of the called end-point 52 based on the header and body routing information. For example, the header routing information may contain an address of a general appliance company to which the call is directed. The body routing information may contain keywords associated with the caller, such as, for example, "washing machine," "service," and "model ABC." Based on this information, the proxy server 56*a* may deduce the caller intent and route the call to an agent skilled in answering questions about the servicing of washing machine model ABC using information retrieved from the database 57 and location server 58.

In step 80, the proxy server 56*a* issues a second INVITE message to the ascertained address. All or portions of the received body routing information may also be provided to the called end-point in the body of the second INVITE message. This may be desirable, for example, to facilitate discussions between a customer representative at the called end-point 52 and a caller at the calling end-point 50.

The called end-point 52 receives the second INVITE message and alerts the user of the request by, for example, causing the user's telephone to ring. If the call is answered, the called end-point 52, in step 82, returns a success indication to the proxy server 56*a* via an OK response. The proxy server 56*a* in turn forwards the OK response in step 84 to the calling end-point 50. The receipt of the success result is confirmed by the calling end-point 50 by transmitting an ACK request to the proxy server 56*a* in step 86, which then forwards it to the called end-point 52 in step 88. Voice conversation between users of the calling and called end-points 50, 52 ensues in step 90 via their respective handsets 60, 62.

Figure 4:
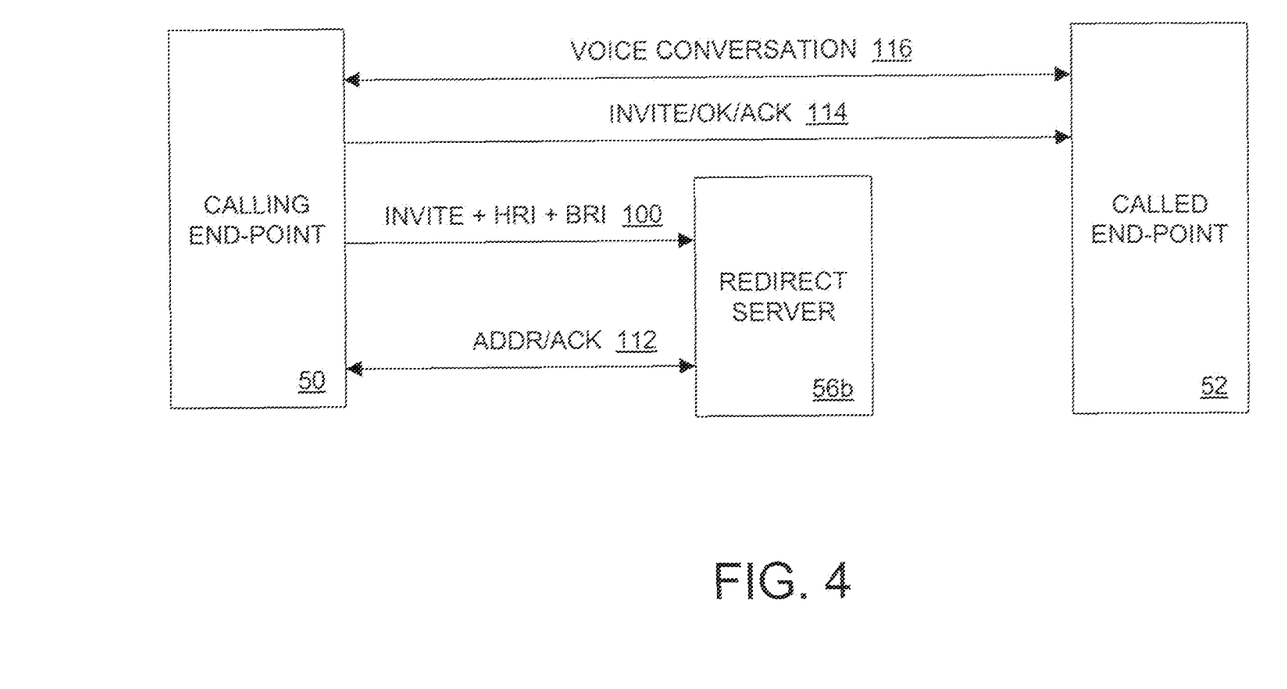
FIG. 4 is a functional block diagram for establishing a SIP call based on caller information according to one embodiment of the invention where a redirect SIP server is used.

FIG. 4 is a functional block diagram for establishing a SIP call based on caller information according to another embodiment of the invention where the SIP server 56 is a redirect server 56*b*. In step 100, the redirect server 56*b* accepts an INVITE message including header and body routing information, and, as the proxy server 56*a* for FIG. 3, examines the header and body information for ascertaining an address to the called end-point using information retrieved from the database 57 and location server 58.

In step 112, the redirect server 56*b* returns the ascertained address to the calling end-point 50 which confirms receipt of the address via an ACK request. In step 114, the calling end-point 50 issues a new INVITE request to the address returned by the redirect server 56*b*. If the call succeeds, the called end-point 52 transmits an OK response, and the calling end-point 50 completes the handshake with an ACK request. Voice conversation between the users of the calling and called end-points 50, 52 ensues in step 116 via their respective handsets 60, 62. All or portions of the received body routing information may also be provided to the called end-point in the body of the second INVITE message. This may be desirable, for example, to facilitate discussions between a customer representative at the called end-point 52 and a caller at the calling end-point 50.

Figure 5:
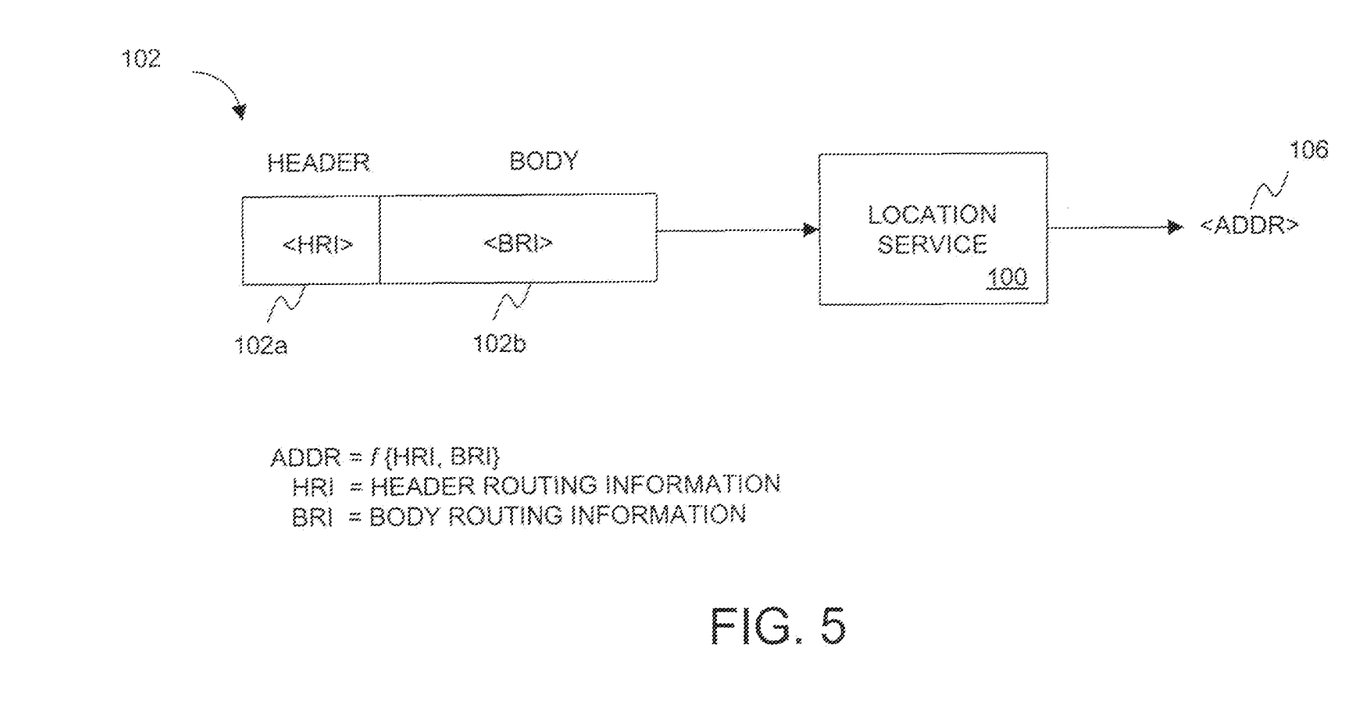
FIG. 5 is a functional block diagram for determining an address of a called end-point using caller information according to one embodiment of the invention.

FIG. 5 is a functional block diagram for determining an address of a called end-point according to one embodiment of the invention. A location service 100 receives an INVITE message 102 from the calling end-point 50. The message preferably contains header routing information 102*a* preferably including "From:," "To:," "Contact:," and other standardized routing fields set forth in RFC 2543. In addition to the header routing information, the message preferably also contains body routing information 102*b*. The body routing information 102*b* includes information associated with the caller that may be used to deduce the caller's intent.

The location server 100 produces an address 106 as a function of the header routing information and body routing information. In this regard, the location server 100 may deduce the address using information in the location server 58 and database 57 and/or based on rules and processing logic for ascertaining a most appropriate address. The address may be, for instance, a specific IP address.

The location service is preferably a software module residing in the server 56. Alternatively, the location service may be a software module residing in the location server 58 and/or database 57. A person skilled in the art should recognize, however, that the location service may be implemented in firmware, hardware, or in any combination of software, firmware, and/or hardware.

Figure 6:
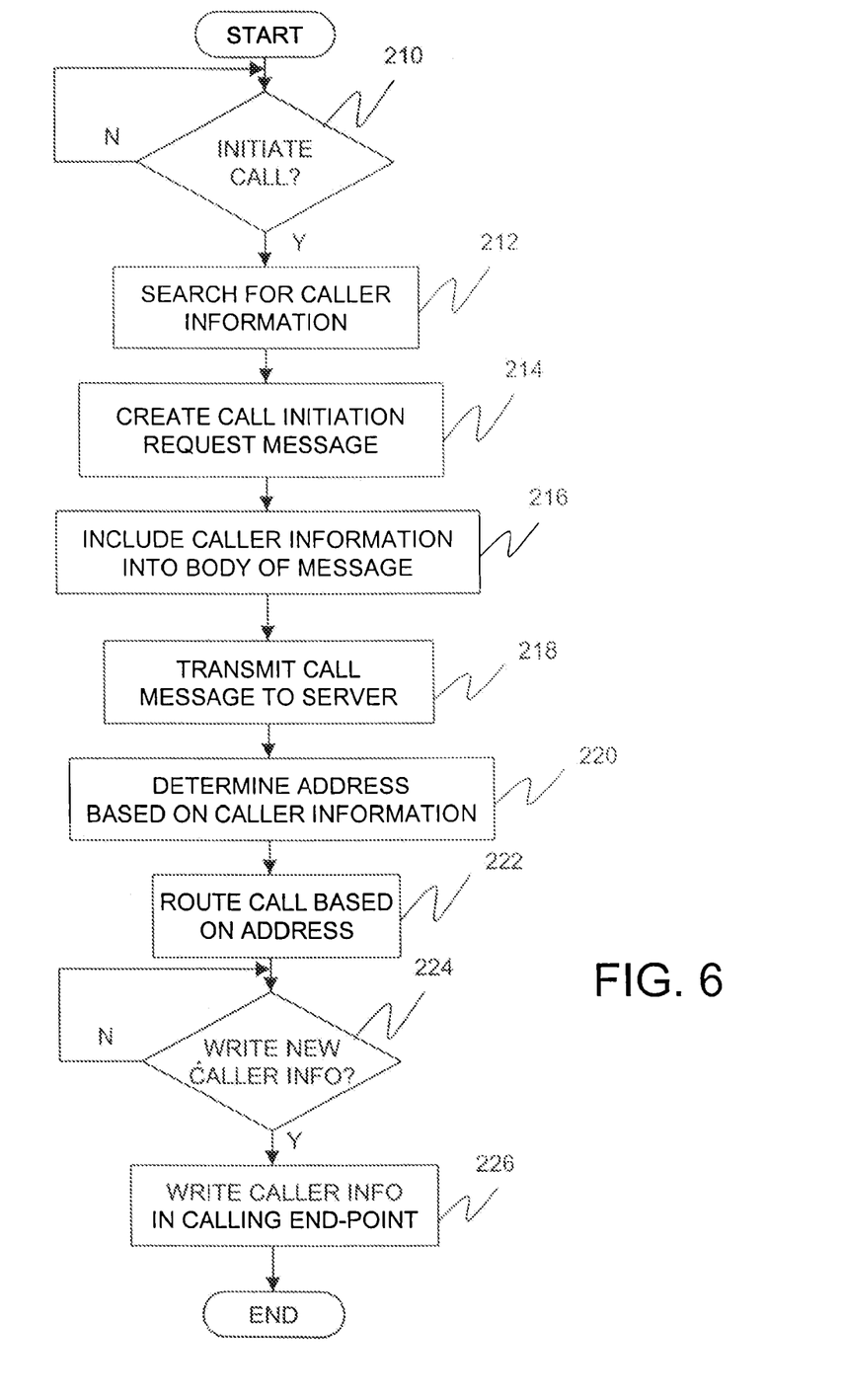
FIG. 6 is a flow diagram of a process for an IP telephony call setup according to one embodiment of the invention.

FIG. 6 is a flow diagram of a process for an IP telephony call setup according to one embodiment of the invention. The process starts, and in step 210, the calling end-point 50 determines if a request was received to initiate a call. A caller may request that a call be initiated by, for example, selecting a click-to-call button from a web page provided by a browser resident in the calling end-point. If a request was received, the calling end-point searches a data store, in step 212, for the caller information. The data store may be a RAM, disk drive, or any other storage device conventional in the art. The calling end-point searches for a particular file-name, file extension, or the like, where caller information is known to be stored.

Preferably, the calling end-point retrieves caller information that is relevant to the destination of the call and the associated server 56.

According to one embodiment of the invention, the retrieved caller information is used to fill entries in the web page for user verification. For example, the web page may provide entries for a last called department, a last called agent, a product name, an account number, and the like, which the calling end-point automatically fills out based on the retrieved caller information. The user may modify the automatically filled information after review.

In step 214, the calling end-point creates a call initiation request message, such as for example, a SIP INVITE message, with standard header routing information for transmitting to the server 56. In addition, the calling end-point, in step 216, includes the retrieved caller information in the body of the call initiation request message as body routing information.

In step 218, the calling end-point transmits the call initiation request message including the header and body routing information to the server 56. The server 56 receives the call initiation request message and retrieves from it the header routing information and the body routing information. In step 220, the server 56 determines an address of the called end-point as a function of the header routing information and the body routing information. For example, while the header routing information may indicate a general customer service number in the "To:" field, the body routing information may indicate a particular department or agent to which to route the call. In step 222, the SIP server routes the call to an end-point based on the determined address.

In step 224, a determination is made as to whether new caller information is to be written to the calling end-point 50. Such information may be provided by the server 56, called end-point 52, or the calling end-point itself If the answer is YES, the calling end-point stores the information in an appropriate storage location. The information is then used for routing future body routing information.

Although this invention has been described in certain specific embodiments, those skilled in the art will have no difficulty devising variations which in no way depart from the scope and spirit of the present invention. It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A method for establishing an IP telephony session between a first device and a second device, the method comprising:
   receiving a call establishment message at a server from the first device, the call establishment message including a first routing information in a header portion of the message and a second routing information in a body portion of the message;
   examining, by the server, the first and second routing information to determine an address of the second device; and
   using the address for routing the session to the second device;
   wherein the second routing information includes transaction information related to a previous transaction between the first device and a third party associated with the second device;
   wherein the call establishment message is a session initiation protocol message;
   wherein the second device writes additional information related to the session in the first device for use by the first device in generating routing information in the body of future call establishment messages of future IP telephony sessions initiated by the first device.

2. The method of claim 1, wherein the second routing information further includes information gathered about a user of the first device.

3. The method of claim 1, wherein the second routing information further includes caller intent information.

4. The method of claim 3, wherein the caller intent information includes information of an intent of a user of the first device in initiating the session.

5. A method for establishing an IP telephony session between a first device and a second device, the method comprising:
   retrieving caller intent information from a data store on the first device;
   creating a first call establishment message including a header and a body, the body including the caller intent information and further including transaction information related to a previous transaction between the first device and a third party associated with the second device;
   transmitting the first call establishment message to a server;
   receiving, from the server, an address of the second device determined by the server using the caller intent information and the transaction information;
   creating a new call establishment message including the address of the second device; and
   transmitting the new call establishment message to the server for routing, by the server, the session to the second device;
   wherein the first call establishment message and the new call establishment message are session initiation protocol messages;
   wherein the second device writes additional information related to the session in the first device for use by the first device in generating routing information in the body of future call establishment messages of future IP telephony sessions initiated by the first device.

6. The method of claim 5, wherein the caller intent information includes information of an intent of a user of the first device in initiating the session.

7. An IP telephony system comprising:
   a first device;
   a second device; and
   a server operative between the first device and the second device;
   wherein the first device creates a call establishment message for a session, the call establishment message including a header and a body, the body including caller intent information and further including transaction information related to a previous transaction between the first device and a third party associated with the second device; and
   wherein the server examines the caller intent information and the transaction information to determine an address of the second device and routes the session to the second device using the address;
   wherein the call establishment message is a session initiation protocol message;
   wherein the second device writes additional information related to the session in the first device for use by the first device in generating routing information in the body of future call establishment messages of future IP telephony sessions initiated by the first device.

8. The system of claim 7, wherein the caller intent information includes information of an intent of a user of the first device in initiating the session.

9. The system of claim 7 wherein the server writes additional information related to the session in the first device for use by the first device in generating the routing information in the body of the future call establishment messages.

10. A server in an IP telephony system operative between a first device and a second device, the server being configured for:
  receiving a call establishment message for a session from the first device, the call establishment message including a first routing information in a header portion of the message and a second routing information in a body portion of the message;
  examining the first and second routing information to determine an address of the second device; and
  using the address for routing the session to the second device;
  wherein the second routing information includes transaction information related to a previous transaction between the first device and a third party associated with the second device;
  wherein the call establishment message is a session initiation protocol message;
  wherein the second device writes additional information related to the session in the first device for use by the first device in generating routing information in the body of future call establishment messages of future IP telephony sessions initiated by the first device.

11. The server of claim 10, wherein the second routing information further includes information gathered about a user of the first device.

12. The server of claim 10, wherein the second routing information further includes caller intent information.

13. The server of claim 12, wherein the caller intent information includes information of an intent of a user of the first device in initiating the session.

14. A method for establishing an IP telephony session, the method comprising the steps of:
  receiving at a server from a first device a SIP message, the SIP message including a SIP message header having routing information and a SIP message body having caller intent information and transaction information related to a previous transaction between the first device and a third party associated with the second device;
  examining, by the server, the caller intent information, the transaction information and the routing information to determine an address of a second device; and
  establishing, by the server, using the address, a SIP session between the first and second devices;
  wherein the second device writes additional information related to the session in the first device for use by the first device in generating routing information in the body of future call establishment messages of future IP telephony sessions initiated by the first device.

15. The method of claim 14, wherein the establishing step comprises the substep of transmitting to the second device a second SIP message including a second SIP message header having the address.

16. A method for establishing an IP telephony session, the method comprising the steps of:
  collecting from a user on a first device caller intent information;
  generating on the first device a SIP message, the SIP message including a SIP message header having routing information and a SIP message body having the caller intent information and transaction information related to a previous transaction between the first device and a third party associated with a second device;
  transmitting to a SIP server the SIP message;
  examining, on the SIP server, the routing information, the transaction information and the caller intent information, to determine an address of the second device; and
  establishing, using the address, a SIP session between the first and second devices;
  wherein the second device writes additional information related to the session in the first device for use by the first device in generating routing information in the body of future call establishment messages of future IP telephony sessions initiated by the first device.

17. The method of claim 16, wherein the establishing step comprises the substep of transmitting to the second device a second SIP message including a second SIP message header having the address.

18. The method of claim 1, further comprising:
  returning, from the server, the address of the second device to the first device; and
  receiving a new call establishment message from the first device, the new call establishment message including the address of the second device.

19. The method of claim 1, further comprising:
  creating, by the server, a new call establishment message including the address of the second device.

* * * * *